United States Patent
Yoshimura et al.

(10) Patent No.: US 10,604,016 B2
(45) Date of Patent: Mar. 31, 2020

(54) INTERIOR STRUCTURE FOR VEHICLE

(71) Applicants: DaikyoNishikawa Corporation, Hiroshima (JP); MAZDA MOTOR CORPORATION, Hiroshima (JP)

(72) Inventors: Toshiteru Yoshimura, Aki-gun (JP); Masato Sadano, Hiroshima (JP)

(73) Assignees: DaikyoNishikawa Corporation, Hiroshima (JP); MAZDA MOTOR CORPORATION, Hiroshima (JP)

( * ) Notice: Subject to any disclaimer, the term of this patent is extended or adjusted under 35 U.S.C. 154(b) by 51 days.

(21) Appl. No.: 15/774,957

(22) PCT Filed: Nov. 18, 2016

(86) PCT No.: PCT/JP2016/084244
§ 371 (c)(1),
(2) Date: May 9, 2018

(87) PCT Pub. No.: WO2017/090522
PCT Pub. Date: Jun. 1, 2017

(65) Prior Publication Data
US 2018/0354366 A1    Dec. 13, 2018

(30) Foreign Application Priority Data

Nov. 26, 2015   (JP) ................................. 2015-230882

(51) Int. Cl.
  *B60K 37/04*   (2006.01)
  *B60K 35/00*   (2006.01)
  (Continued)

(52) U.S. Cl.
CPC .............. *B60K 37/04* (2013.01); *B60K 35/00* (2013.01); *B60K 37/00* (2013.01); *B60R 11/00* (2013.01);
(Continued)

(58) Field of Classification Search
CPC ........ B60K 35/00; B60K 37/00; B60K 37/04; B60K 2370/50; B60K 2370/1529;
(Continued)

(56) References Cited

U.S. PATENT DOCUMENTS 3,887,273 A * 6/1975 Griffiths ................. B60K 37/00
                                                      353/14
4,635,033 A * 1/1987 Inukai .................... B60K 37/00
                                                      353/14
(Continued)

FOREIGN PATENT DOCUMENTS

JP     H06-183284 A    7/1994
JP     H10-278647 A   10/1998
(Continued)

OTHER PUBLICATIONS

International Search Report issued in PCT/JP2016/084244; dated Jan. 10, 2017.

*Primary Examiner* — Gregory A Blankenship
(74) *Attorney, Agent, or Firm* — Studebaker & Brackett PC

(57) ABSTRACT

An interior structure for a vehicle includes: an instrument panel disposed below a front window; an instrument panel reinforcement extending in a vehicle width direction of the vehicle at a position below the instrument panel; a head-up display device having a housing structure including a front surface and a lower surface, and configured to project information onto the front window; and a support member mounted in the instrument panel, and configured to fixedly support the head-up display device. The support member includes a front wall facing the front surface of the head-up display device and a lower wall facing the lower surface, a first fixing portion serving as a fixing portion to the instru- (Continued)

ment panel, and a second fixing portion serving as a fixing portion to the instrument panel reinforcement.

15 Claims, 14 Drawing Sheets

(51) Int. Cl.
 *B60K 37/00* (2006.01)
 *B60R 11/00* (2006.01)
 *B60R 11/02* (2006.01)
(52) U.S. Cl.
 CPC .. *B60R 11/0229* (2013.01); *B60K 2370/1529* (2019.05); *B60K 2370/60* (2019.05); *B60R 2011/0005* (2013.01)
(58) Field of Classification Search
 CPC . B60R 11/00; B60R 11/0229; B60R 11/0005; B60R 11/0235; B62D 25/14; B62D 25/145
 USPC .......................... 296/70, 72, 193.02; 180/90
 See application file for complete search history.

(56) References Cited

U.S. PATENT DOCUMENTS

| 5,563,620 | A | 10/1996 | Terai | |
|---|---|---|---|---|
| 5,997,068 | A | 12/1999 | Matsushita | |
| 2009/0033126 | A1* | 2/2009 | Mullen | B60K 37/00 296/193.02 |
| 2014/0125085 | A1* | 5/2014 | Wakibayashi | B60K 37/02 296/70 |
| 2016/0089978 | A1* | 3/2016 | Takahashi | G02B 27/0101 359/599 |
| 2016/0200366 | A1* | 7/2016 | Sanjo | B62D 25/145 296/70 |
| 2017/0082856 | A1* | 3/2017 | Satou | B60K 37/04 |
| 2017/0363866 | A1* | 12/2017 | Murzyn | G02B 27/0101 |
| 2018/0011315 | A1* | 1/2018 | Kamiyama | G02B 27/0101 |
| 2018/0354366 | A1* | 12/2018 | Yoshimura | B60K 37/04 |
| 2019/0047418 | A1* | 2/2019 | Yoshimura | B60H 1/00028 |
| 2019/0050017 | A1* | 2/2019 | Nobuoka | B60K 37/00 |
| 2019/0227308 | A1* | 7/2019 | Yokoe | G02B 27/0101 |

FOREIGN PATENT DOCUMENTS

| JP | 2009-001149 A | 1/2009 |
|---|---|---|
| JP | 2012-116263 A | 6/2012 |

* cited by examiner

INTERIOR STRUCTURE FOR VEHICLE

TECHNICAL FIELD

The present invention relates to an interior structure for a vehicle provided with a head-up display device.

BACKGROUND ART

In recent years, in a vehicle such as an automobile, a head-up display (HUD) device is incorporated in an instrument panel (e.g. Patent Literature 1). An HUD device projects information (image) beneficial to a driver onto a combiner disposed in a viewing direction of a driver or onto a front widow itself when the driver drives a vehicle. The projected image is reflected on the front window, and a virtual image is formed. The driver visually recognizes the virtual image while overlapping the virtual image on a landscape in front of the vehicle.

When a variety of pieces of information are projected on a front window, a projection range of light beam by an HUD device naturally extends. It is necessary to make an optical path length long from a projection light source to a front window in order to form a projection image having a large display size. An instrument panel and a front window are disposed in proximity to each other, and a sufficient optical path length may not be secured between the instrument panel and the front window. In view of the above, it is necessary to secure an optical path length by disposing a mirror for reflecting a projected light beam within a housing of an HUD device, for example. Consequently, the HUD device tends to be a unit of a large size and a heavy weight.

In an HUD device having a large size and a heavy weight as described above, it is necessary to provide a fixing structure having rigidity with respect to a vehicle so that the HUD device is not shaken by vibration applied thereto when a vehicle travels, in other words, a projected image is not shaken. On the other hand, it is desirable to configure the HUD device in such a manner that the HUD device is mountable and dismountable to and from an instrument panel relatively easily for maintenance, repair, and the like of the HUD device.

CITATION LIST

Patent Literature

Patent Literature 1: Japanese Unexamined Patent Publication No. 2009-1149

SUMMARY OF INVENTION

An object of the present invention is to provide an interior structure for a vehicle, which makes it easy to mount and dismount a head-up display device to and from an instrument panel, while firmly supporting the head-up display device within the instrument panel.

An interior structure for a vehicle according to an aspect of the present invention includes: an instrument panel disposed below a front window; an instrument panel reinforcement extending in a vehicle width direction of the vehicle at a position below the instrument panel; a head-up display device having a housing structure including a front surface and a lower surface, and configured to project information onto the front window; and a support member mounted in the instrument panel, and configured to fixedly support the head-up display device. The support member includes a front wall facing the front surface of the head-up display device and a lower wall facing the lower surface, a first fixing portion serving as a fixing portion to the instrument panel, and a second fixing portion serving as a fixing portion to the instrument panel reinforcement.

DESCRIPTION OF EMBODIMENTS

[Outline of Interior Structure for Vehicle]

Figure 1:
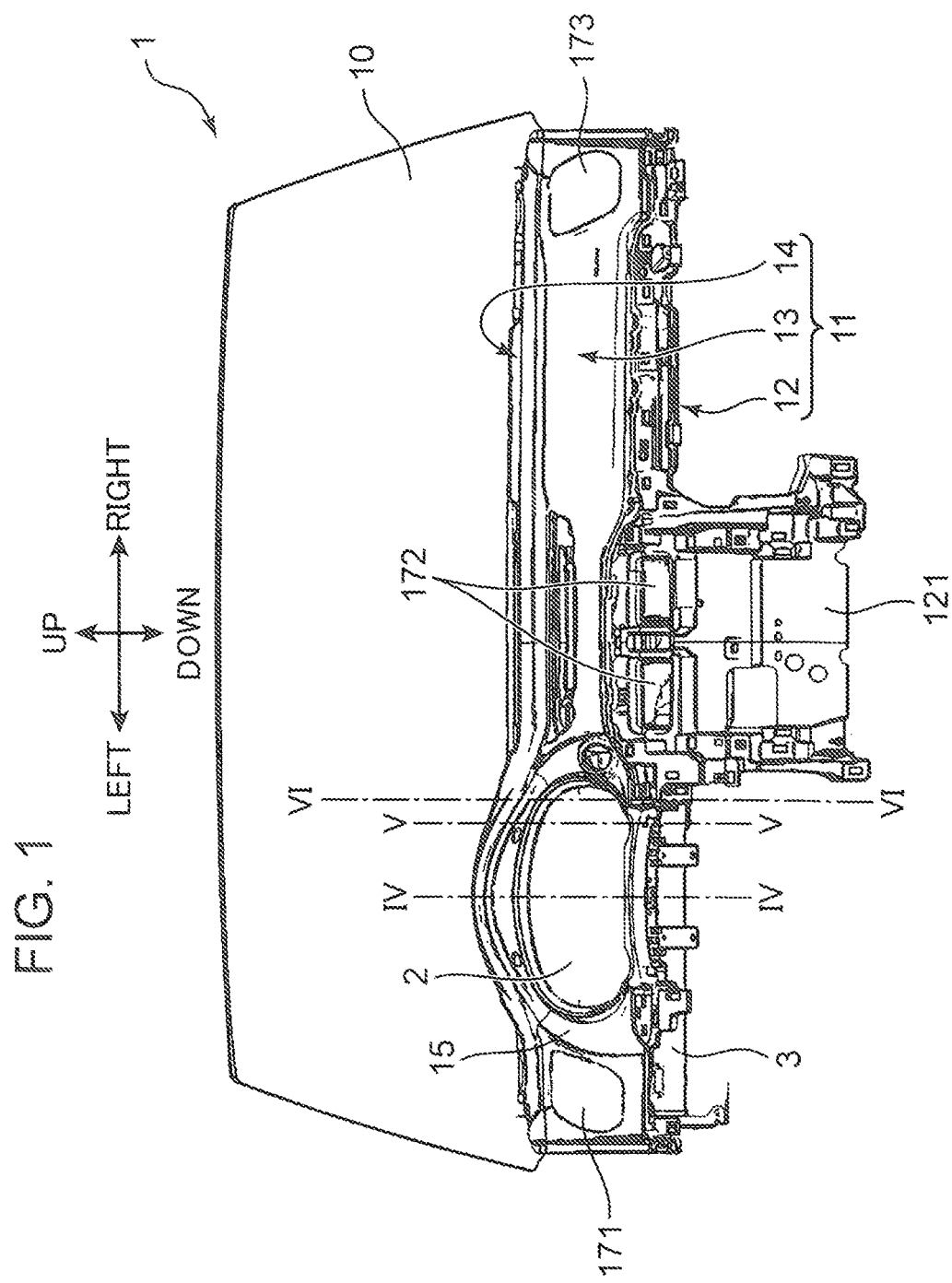
FIG. 1 is a front view illustrating an interior structure for a vehicle, to which the present invention is applied.
Figure 2:
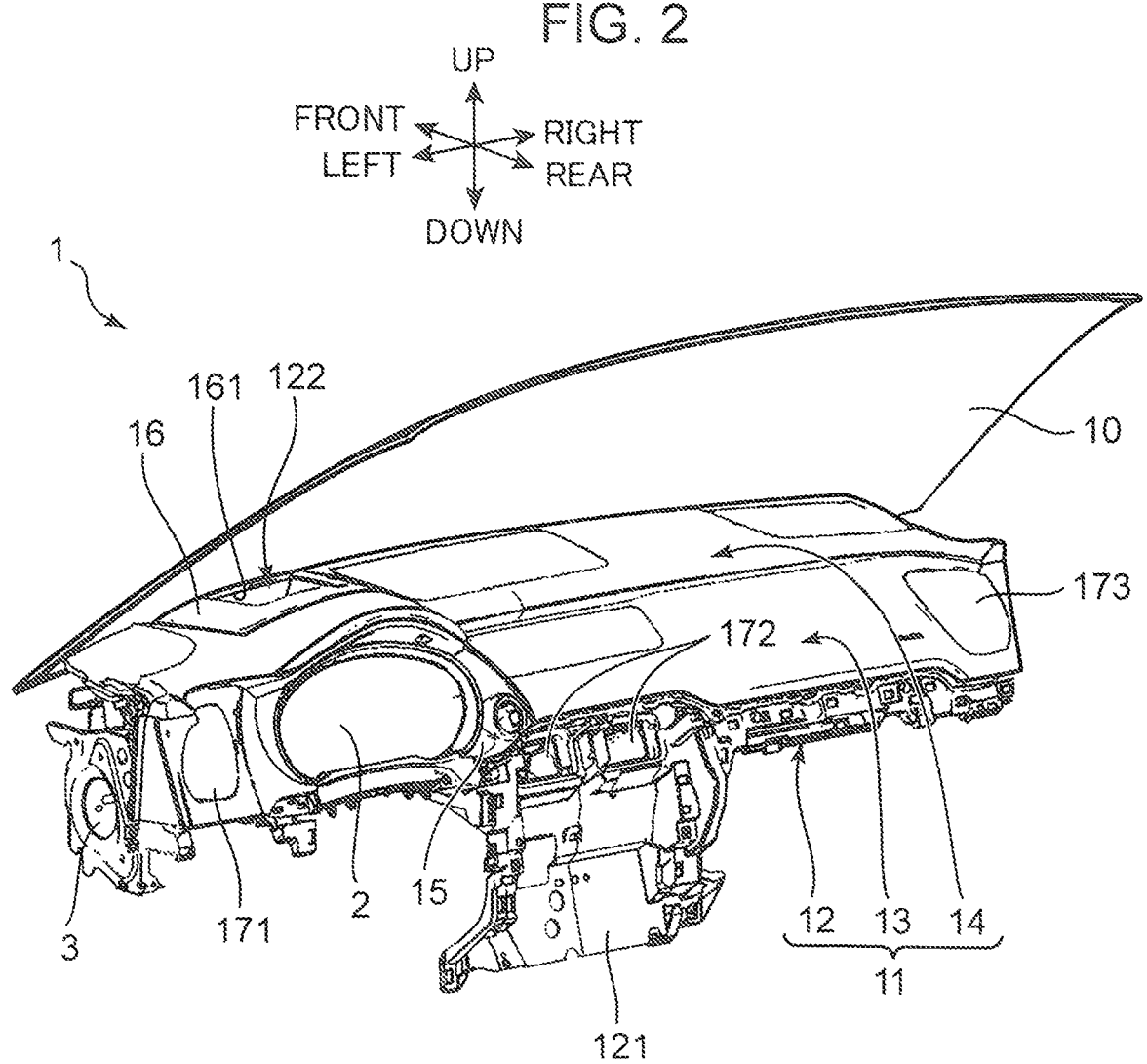
FIG. 2 is a perspective view of the interior structure.
Figure 3:
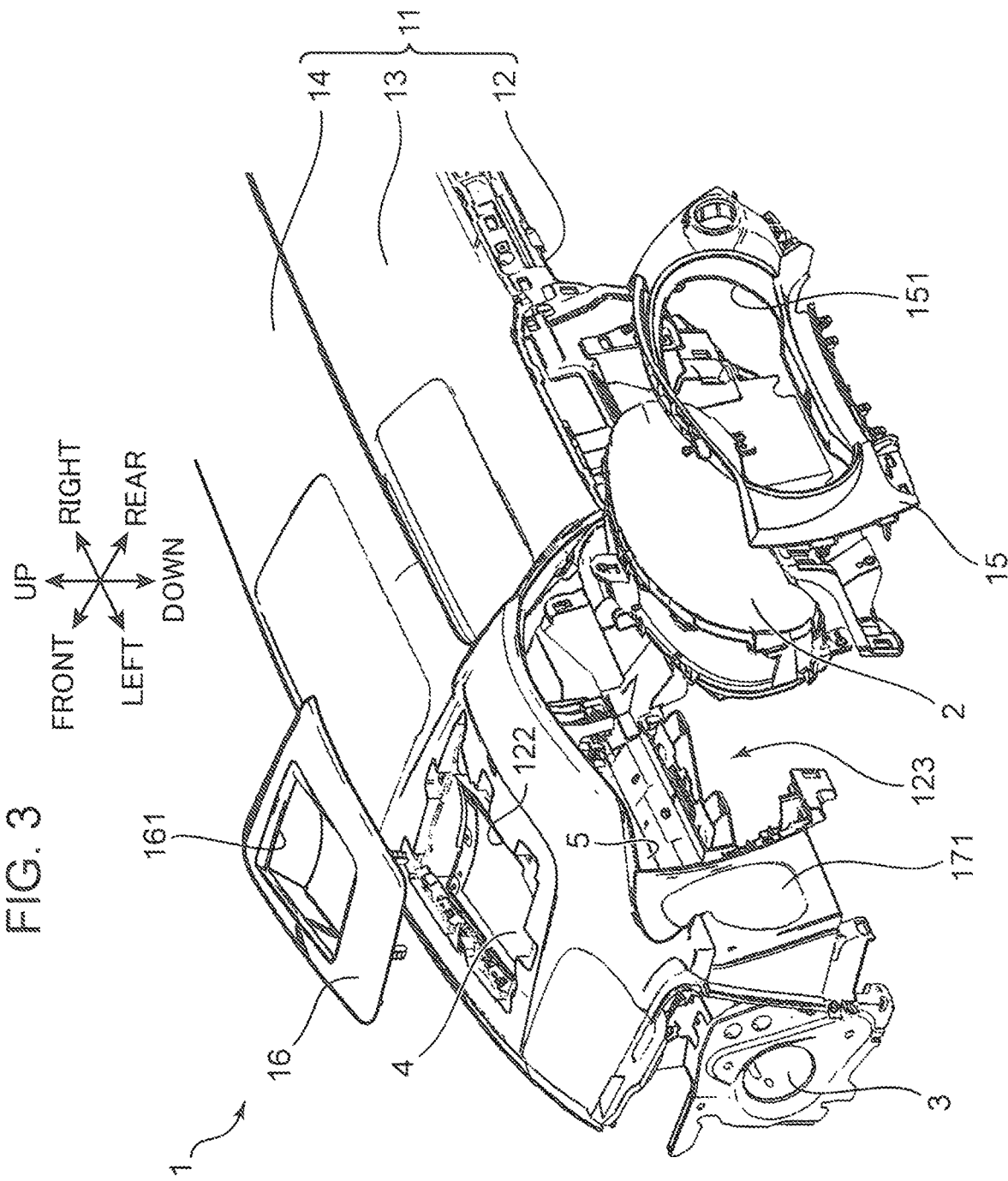
FIG. 3 is an exploded perspective view of an instrument panel.

In the following, an embodiment of the present invention is described in detail based on the drawings. FIG. 1 is a front view illustrating a front portion of an interior structure for a vehicle 1, to which the present invention is applied. FIG. 2 is a perspective view of the interior structure. FIG. 1 and FIG. 2 illustrate a front window 10 and an instrument panel 11 of the interior structure. FIG. 3 is an exploded perspective view of the instrument panel 11. In FIG. 1, FIG. 2, and FIG. 3, arrows indicating "front" and "rear" in a front-rear direction of the vehicle 1, arrows indicating "left" and "right" in a vehicle width direction, and arrows "up" and "down" in a vehicle height direction are illustrated. Indication of arrows "front", "rear", "up", "down", "left", and "right" in the following drawings follows indication of the arrows in FIG. 1 to FIG. 3.

The instrument panel 11 is disposed below the front window 10, and substantially extends over the entire width in the vehicle width direction (in a left-right direction). The instrument panel 11 includes an instrument panel body 12, a facing cover 13, and an upper cover 14. The instrument panel body 12 is a member having a width in the left-right direction corresponding to a vehicle width, and composed of a hard resin molded article including a plurality of frame portions for accommodating meters, air-conditioning-related components, a navigation system, an audio system, and the like equipped in the vehicle 1. A console portion 121 for partitioning a driver seat and a passenger seat extends downward from a middle of the instrument panel body 12 in the left-right direction.

The facing cover 13 and the upper cover 14 are members made of a polyurethane foamed material, and forming an outer layer portion of the instrument panel 11. The facing cover 13 covers a surface of the instrument panel 11 facing the seats. The upper cover 14 covers an upper surface of the instrument panel 11, in other words, a surface of the instrument panel 11 facing the front window 10.

An instrument panel reinforcement 3 extending horizontally in the left-right direction is disposed below the instrument panel 11. The instrument panel reinforcement 3 is constituted by a high-rigid metal tubular member, and is fixed to a vehicle body frame (not illustrated) at right and left both ends of the instrument panel reinforcement 3. A lower surface of the instrument panel 11 is supported by the instrument panel reinforcement 3.

As illustrated in FIG. 3, a meter panel 2 and a head-up display device 4 (hereinafter, an HUD device 4) are mounted on a left side (on a driver seat side) of the instrument panel 11. The meter panel 2 is a panel unit mounted to the instrument panel 11 in such a manner as to face the driver seat, and including an analog or digital display portion such as a vehicle speed meter and a fuel indicator. As will be described later, the HUD device 4 is supported by a support member 5 within the instrument panel 11.

The HUD device 4 is a unit having a housing structure, and projects a variety of pieces of information onto the front window 10. The information is driving support information such as a traveling speed of an own vehicle, speed limit information of a traveling zone, warning signs, and indication arrows for navigation, for example. The HUD device 4 generates a projection image of these pieces of information, and projects the projection image toward the front window 10. A virtual image of the projection image reflected on the front window 10 is formed on a front side in a viewing direction of a driver.

A projection light source including, for example, an LED matrix and a TFT color display, and a mirror for reflecting a light beam emitted from the projection light source are incorporated within a housing of the HUD device 4. Normally, the instrument panel 11 and the front window 10 are disposed in proximity to each other, and a sufficient optical path length for forming a projection image of a certain size may not be secured between the instrument panel 11 and the front window 10. In view of the above, a plurality of mirrors are disposed within the housing, and a required optical path length is secured by causing multiple reflections of a projected light beam. When a variety of pieces of information are projected onto the front window 10, a projection range of light beam by the HUD device 4 naturally extends. Since it is necessary to make an optical path length long in order to form a projection image having a large display size, the size of the housing of the HUD device 4 may increase, and the weight thereof may also increase.

The instrument panel body 12 (instrument panel 11) includes an upper opening 122 in an upper surface thereof for projection by the HUD device 4, and a lateral opening 123 in a surface thereof facing the seats (a surface facing rearward of the vehicle 1) for mounting the meter panel 2. The upper opening 122 is a rectangular opening facing the front window 10. A projected light beam from the HUD device 4 is directed toward the front window 10 through the upper opening 122. A size of the upper opening 122 is smaller than the size of a housing 40 (see FIG. 7 and FIG. 8) of the HUD device 4. In other words, in an assembled state of the vehicle 1, it is not possible to take the HUD device 4 out of the instrument panel 11 through the upper opening 122.

The lateral opening 123 has a size capable of receiving the meter panel 2 having a long length in the left-right direction. Since the meter panel 2 has a larger size than the HUD device 4, the lateral opening 123 has a size capable of receiving the housing of the HUD device 4. In other words, in an assembled state of the vehicle 1, it is possible to take the HUD device out of the instrument panel 11 through the lateral opening 123.

A meter cover 15 is fitted in the lateral opening 123, and an opening cover 16 is fitted in the upper opening 122, respectively. The meter cover 15 has an opening 151 for exposing a display surface of the meter panel 2. The meter cover 15 is mounted to a surface of the instrument panel body 12 facing the seats in such a manner as to cover a peripheral portion of the meter panel 2 in a state that the meter panel 2 is fitted in the lateral opening 123. The opening cover 16 has a rectangular projection opening 161, and is mounted to an upper surface of the instrument panel body 12 in such a manner as to cover an upper surface of the HUD device 4.

An unillustrated air-conditioning duct is disposed within the instrument panel 11. Air-conditioned air passing through the air-conditioning duct is caused to flow into a passenger compartment via an outer surface of the instrument panel 11. A left air outlet 171 disposed on the driver seat side, a middle air outlet 172 disposed above the console portion 121, and a left air outlet 173 disposed on the passenger seat side are formed in the instrument panel 11, as air outlets of the air-conditioned air.

[Support Structure of HUD Device]

Figure 4:
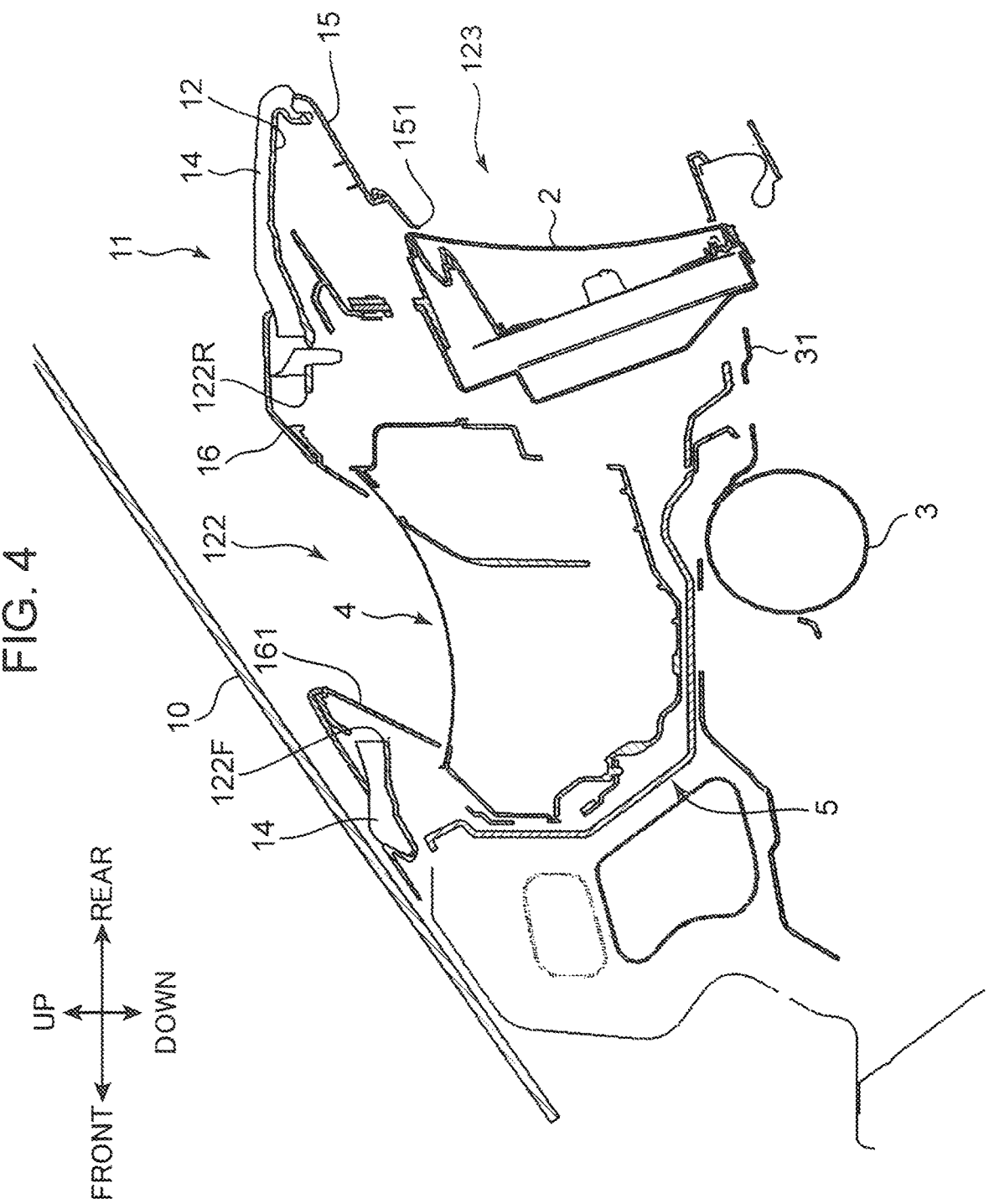
FIG. 4 is a schematic cross-sectional view taken along the line IV-IV in FIG. 1.
Figure 5:
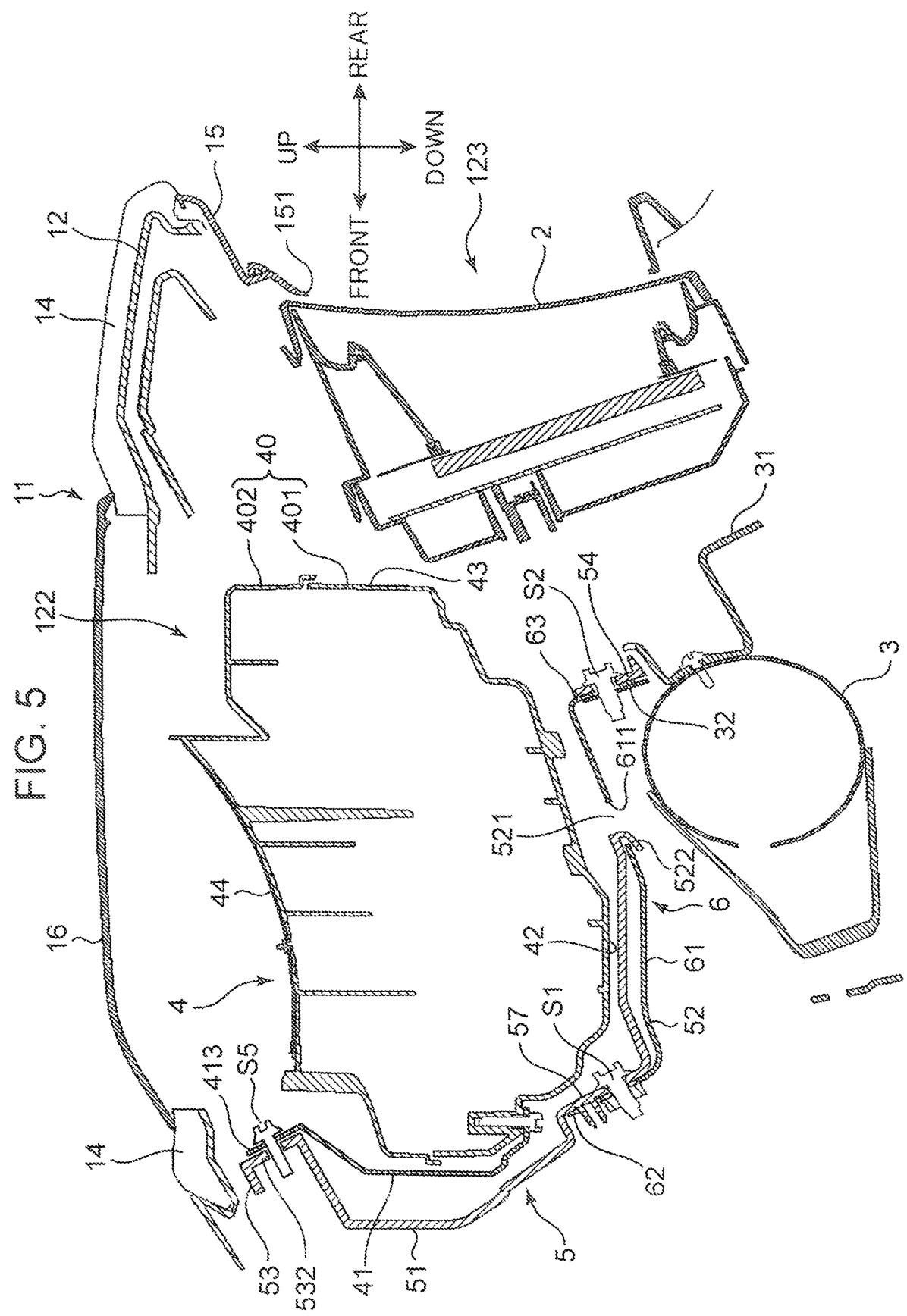
FIG. 5 is a schematic cross-sectional view taken along the line V-V in FIG. 1.
Figure 6:
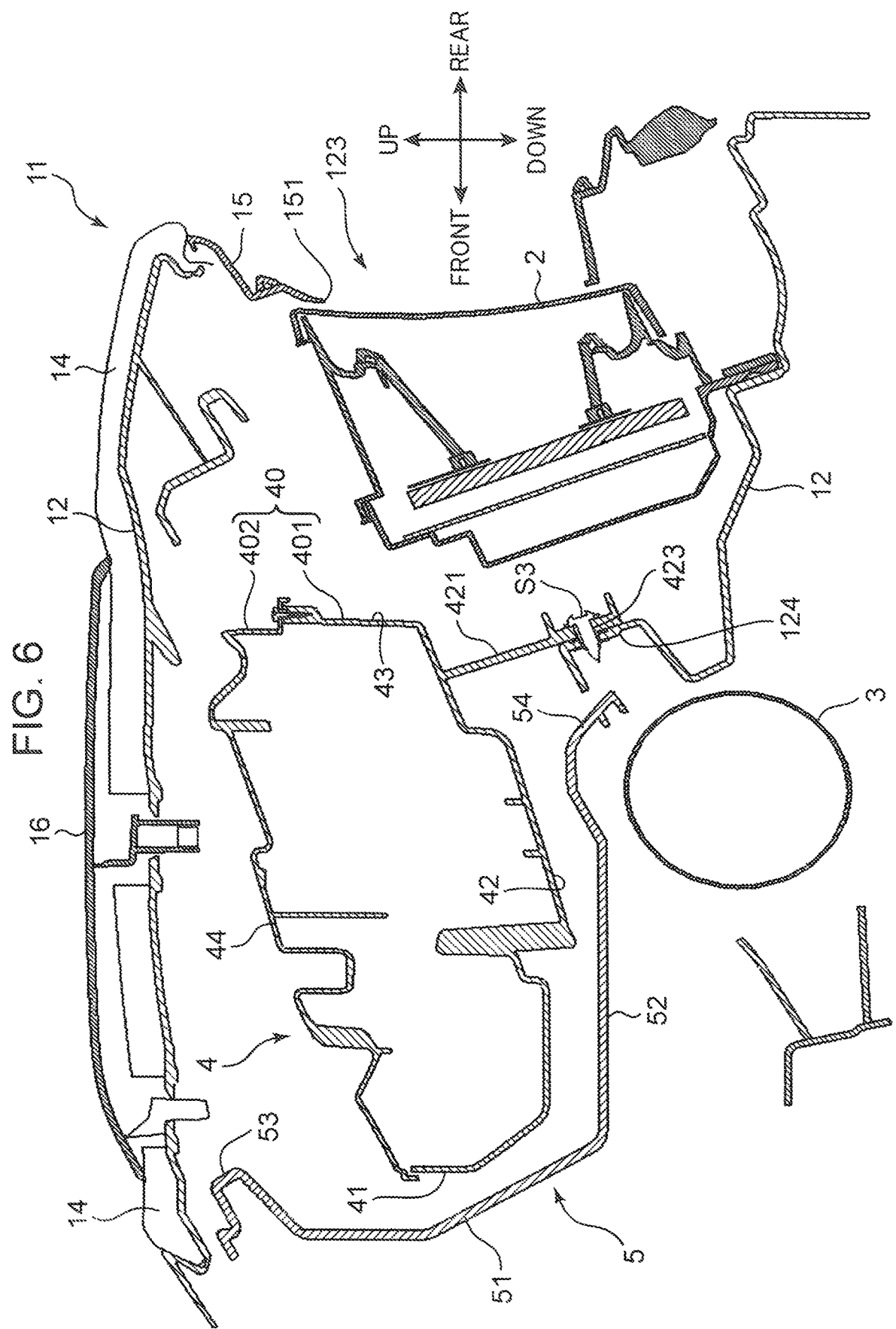
FIG. 6 is a schematic cross-sectional view taken along the line VI-VI in FIG. 1.

Next, a support structure of the HUD device 4 within the instrument panel 11 is described in detail. FIG. 4 to FIG. 6 illustrate cross-sectional structures of the instrument panel 11 in the front-rear direction at a portion where the HUD device 4 is mounted. FIG. 4, FIG. 5, and FIG. 6 are schematic cross-sectional views taken along the line IV-IV, V-V, and VI-VI in FIG. 1, respectively.

As illustrated in FIG. 4, the instrument panel 11 is disposed below the front window 10. The instrument panel 11 is supported by the instrument panel reinforcement 3 from below. The HUD device 4 is mounted to the instrument panel 11 between the front window 10 and the instrument panel reinforcement 3 in a state that the HUD device 4 is supported by the support member 5.

A size of the HUD device 4 in the front-rear direction is larger than a distance between a front edge 122F and a rear edge 122R of the upper opening 122. A size of the HUD device 4 in the left-right direction is also larger than the aforementioned distance. Therefore, even when the opening cover 16 is detached, as described above, it is not possible to take the HUD device 4 out of the instrument panel 11 from above. In the embodiment, it is not possible to take the HUD device 4 out of the instrument panel 11 from above due to the presence of the front window 10, even if the upper opening 122 has a larger size than the HUD device 4.

<Housing of HUD Device>

Figure 7:
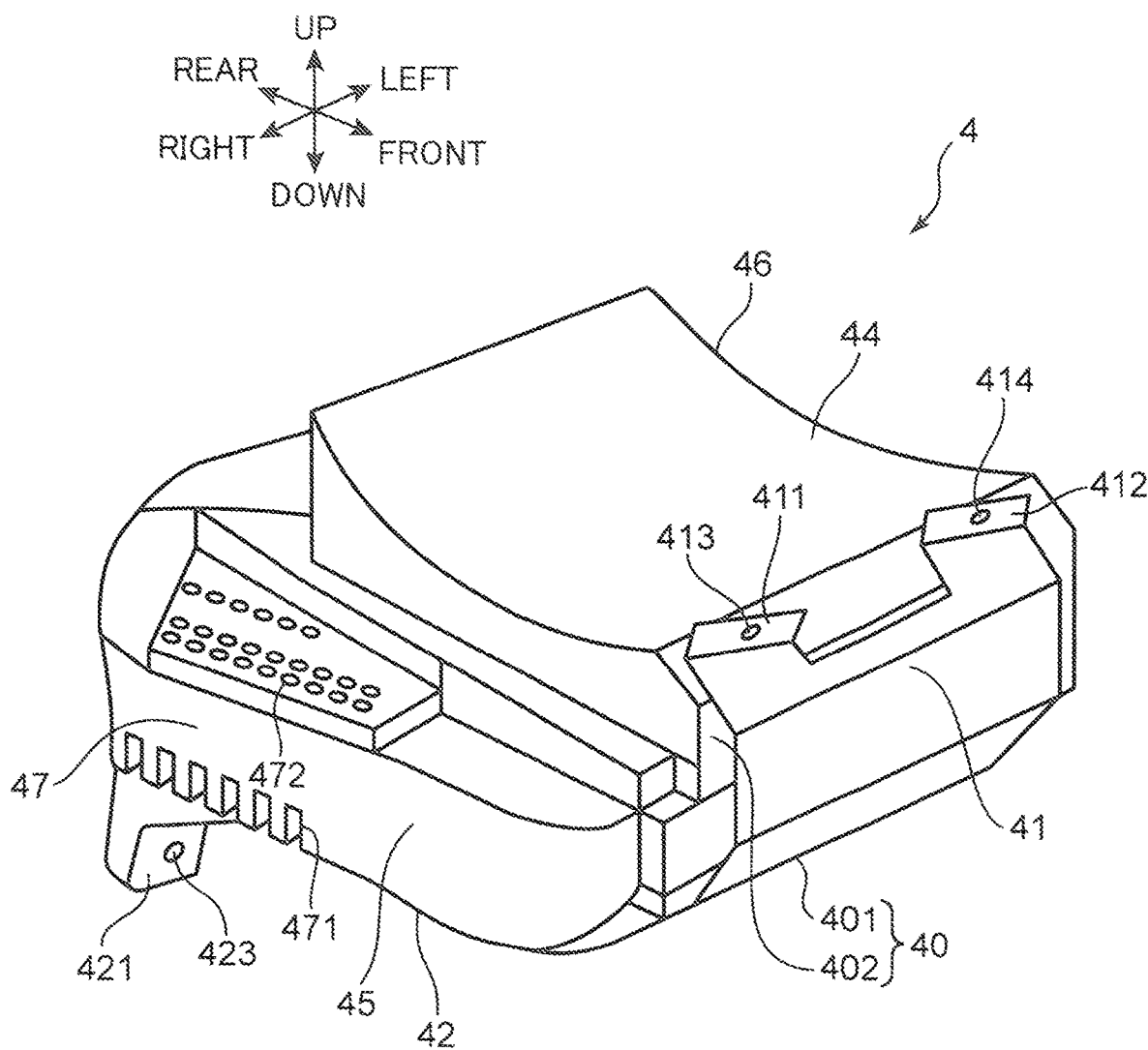
FIG. 7 is a perspective view of a head-up display device.
Figure 8:
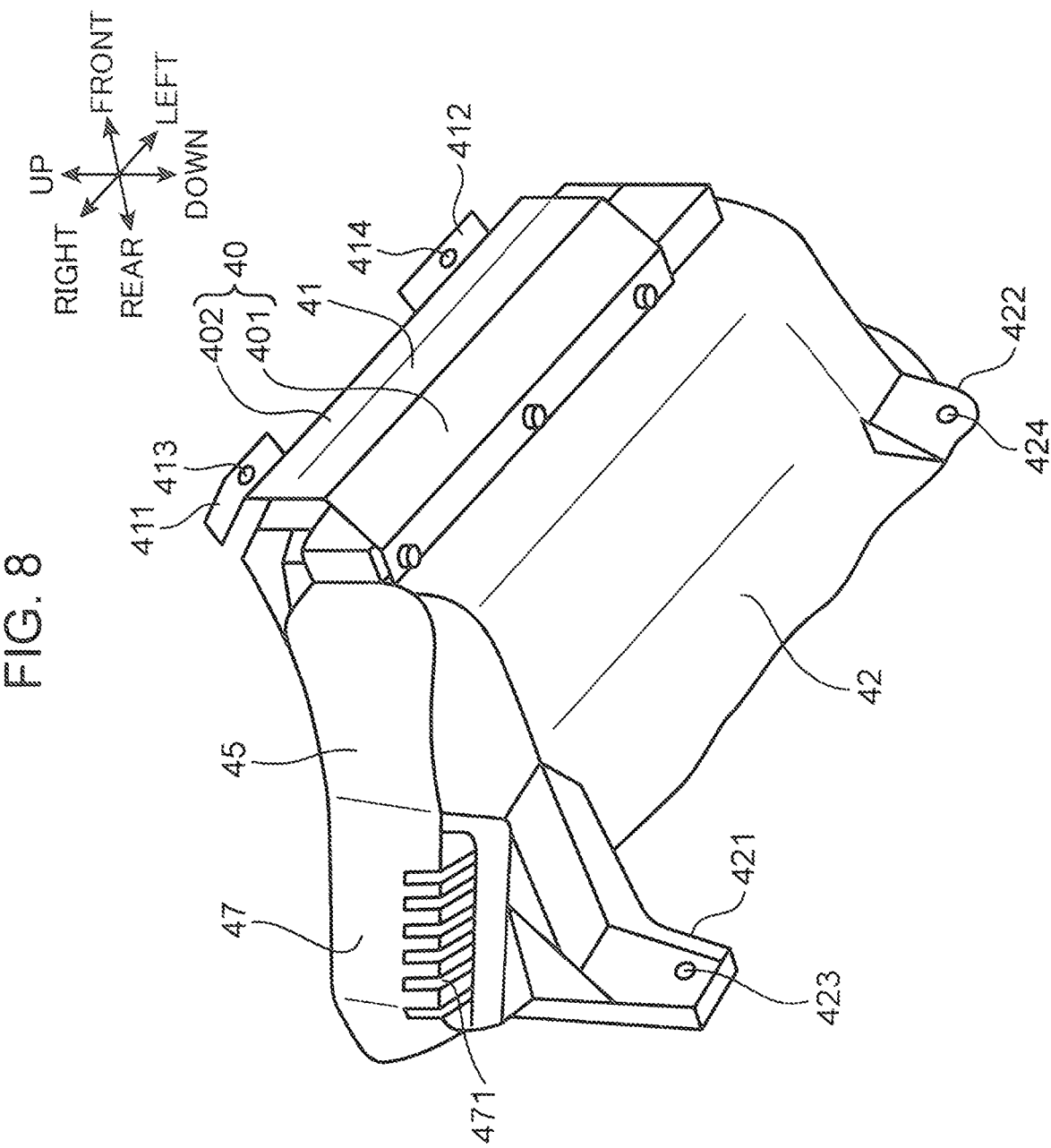
FIG. 8 is a perspective view of the head-up display device, in which a viewing direction is changed.

FIG. 7 is a perspective view of the HUD device 4, and FIG. 8 is a perspective view of the HUD device 4 when a viewing direction is changed. The HUD device 4 includes the housing 40 for accommodating the aforementioned projection light source and an optical system such as a mirror. The housing 40 is constituted by a main body 401 having an opening formed in an upper surface thereof for mounting the projection light source and the optical system, and a lid member 402 for covering the opening of the main body 401. A light-transmissive window portion for transmitting a projected light beam is formed in a top surface of the lid member 402.

The housing 40 has a generally flat rectangular parallelepiped shape, and includes a front surface 41, a lower surface 42, a rear surface 43, an upper surface 44, a right surface 45, and a left surface 46. An upper right bracket 411 and an upper left bracket 412 extend upward from left and right ends of an upper end perimeter of the front surface 41, respectively. These brackets 411 and 412 respectively include fixing holes 413 and 414, and serve as a fixing portion of the housing 40 with respect to the support member 5. A lower right bracket 421 and a lower left bracket 422 extend downward from left and right ends of a rear end perimeter of the lower surface 42 (a lower end perimeter of the rear surface 43), respectively. These brackets 421 and 422 respectively include fixing holes 423 and 424, and serve as a fixing portion of the housing 40 with respect to the instrument panel body 12. The lower right bracket 421 projects downward by a length longer than the lower left bracket 422.

A radiating portion 47 for radiating heat within the housing 40 is disposed at a rear portion of the right surface 45. The projection light source, and a heat sink (not illustrated) for dissipating heat emitted from the projection light source are accommodated in a portion of the housing 40 near a rear side of the right surface 45. Heat from the heat sink is dissipated to the outside from the radiating portion 47. A plurality of slits 471 are formed in a lower region of a wall surface of the radiating portion 47, and a plurality of pores 472 are formed in an upper region of the wall surface for enhancing a heat dissipation effect.

<Support Member>

Figure 9:
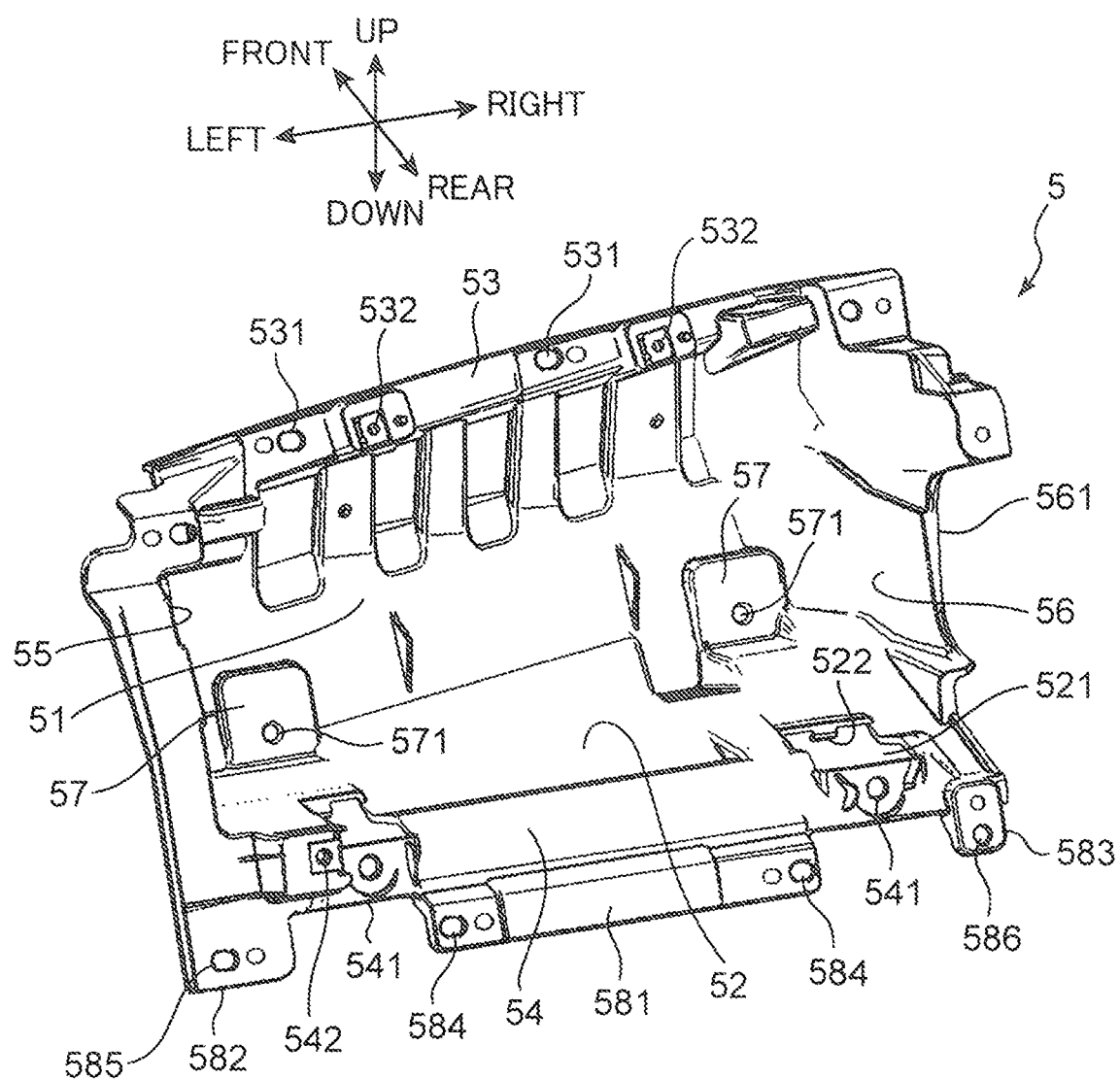
FIG. 9 is a perspective view of a support member.

The support member 5 is mounted in the instrument panel 11 at a position below the upper opening 122, and fixedly supports the HUD device 4. FIG. 9 is a perspective view of the support member 5. Mainly referring to FIG. 9 and FIG. 5, the support member 5 is a member of an L-shape in cross section in the front-rear direction including a front wall 51 and a lower wall 52. An upper flange portion 53 (an extension portion) constituted by a strip-shaped flat surface portion having a long length in the left-right direction projects upward from an upper end of the front wall 51. Likewise, a lower flange portion 54 constituted by a strip-shaped flat surface portion having a long length in the left right direction projects downward from a rear end of the lower wall 52.

The front wall 51 is a wall facing the front surface 41 of the housing 40, and the lower wall 52 is a wall facing the lower surface 42. A height of the upper flange portion 53 is set in such a manner that the upper flange portion 53 is located higher than an upper end of the front surface 41 of the housing 40 (a front end of the upper surface 44) with the HUD device 4 supported by the support member 5. Therefore, an operator handling a tool such as a screw driver is allowed to access the upper flange portion 53 through the upper opening 122 by detaching the opening cover 16.

A pair of left and right fixing holes 531 (a first fixing portion) serving as a fixing portion to an upper portion of the instrument panel body 12, and a pair of left and right support holes 532 serving as a fixing portion to the HUD device 4 are formed in the upper flange portion 53. A pair of left and right fixing holes 541 (one of second fixing portions) serving as a fixing portion to the instrument panel reinforcement 3 are formed in the lower flange portion 54. Rectangular window portions 521 are formed in the lower wall 52 on a front side of the paired fixing holes 541, respectively. A locking piece 522 of a hook shape projects downward from a front edge of each window portion 521. Further, a support hole 542 serving as a fixing portion to the HUD device 4 is formed near a left end of the lower flange portion 54.

The support member 5 further includes a left wall 55 and a right wall 56. The left wall 55 and the right wall 56 are walls for closing a left surface and a right surface of each of the front wall 51 and the lower wall 52. A distance between the left wall 55 and the right wall 56 is wider than a width of the HUD device 4 in the left-right direction. On the other hand, a wall is not present on an upper surface and a rear surface of the support member 5. The housing 40 of the HUD device 4 is disposed above the support member 5 in such a manner that a main portion of the housing 40 is accommodated within a space defined by the front wall 51, the lower wall 52, the left wall 55, and the right wall 56, and in such a manner that the upper surface 44 and the rear surface 43 of the housing 40 do not interfere with the support member 5.

A cutout portion 561 formed by cutting out a rear portion of the right wall 56 is formed in the right wall 56. An unillustrated air-conditioning duct is disposed within the instrument panel 11 outward of the right wall 56. The cutout portion 561 is an opening formed in order to prevent obstruction of heat exchange between the radiating portion 47 of the HUD device 4 and a part of the air-conditioning duct.

A pair of left and right locking portions 57 are formed on a lower end of the front wall 51. The locking portion 57 is a rectangular flat plate portion configured such that a part of the front wall 51 is slightly recessed. A screw hole 571 (one of second fixing portions) serving as a fixing portion to the instrument panel reinforcement 3 is formed in each locking portion 57.

A middle extension portion 581, a left extension portion 582, and a right extension portion 583 extend downward from a lower edge of the lower flange portion 54. The middle extension portion 581 is a flat plate portion extending downward from a middle of the lower flange portion 54 in the left-right direction with a long length in the left-right direction. A pair of left and right fixing holes 584 are formed in the middle extension portion 581. The fixing holes 584 serve as a fixing portion of the support member 5 with respect to a lower portion of the instrument panel body 12. The left extension portion 582 is a flat plate portion extending downward from a left end of the lower flange portion 54, and a fixing hole 585 serving as a fixing portion to the lower portion of the instrument panel body 12 is formed in the left extension portion 582. The right extension portion 583 is a small flat plate portion extending downward from a right end of the lower flange portion 54, and a support hole 586 serving as a fixing portion to the instrument panel body 12 is formed in the right extension portion 583.

<Instrument Panel Reinforcement>

Figure 10:
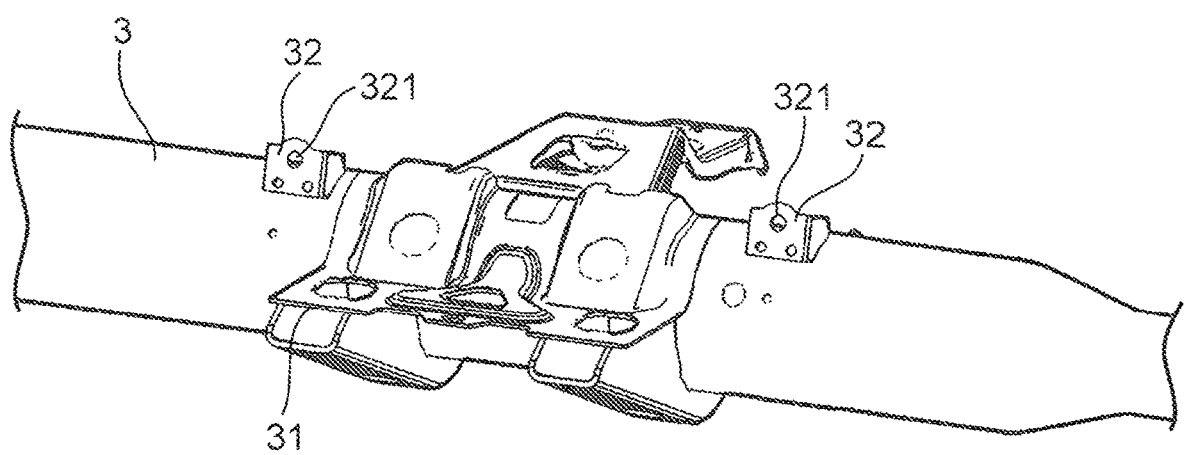
FIG. 10 is a perspective view of essential parts of an instrument panel reinforcement.

FIG. 10 is a perspective view illustrating essential parts of the instrument panel reinforcement 3. An instrument panel support metal fitting 31 and a support piece 32 are mounted on an outer peripheral surface of the instrument panel reinforcement 3. The instrument panel support metal fitting 31 is a metal fitting for connecting a lower surface of the instrument panel 11 and the instrument panel reinforcement 3. By the connection, the instrument panel 11 is supported by the high-rigid instrument panel reinforcement 3, which is firmly supported by an unillustrated vehicle body frame.

The support piece 32 is provided in pair on left and right sides of the instrument panel support metal fitting 31, and is mounted to an outer peripheral surface of the instrument panel reinforcement 3. The support pieces 32 are metal fittings for connecting the support member 5 and the instrument panel reinforcement 3 to allow the support member 5 for supporting the HUD device 4 to support the instrument panel reinforcement 3. A support hole 321 is formed in each support piece 32. In the embodiment, the support member 5 is supported by the instrument panel reinforcement 3 via a support bracket 6 to be described next.

<Support Bracket>

Referring to FIG. 5, the support bracket 6 is a plate-shaped member extending in the front-rear direction of the vehicle 1 at a position below the HUD device 4. The support bracket 6 includes a horizontal portion 61 extending along a lower surface of the lower wall 52 of the support member 5, a front end portion 62 (a first end portion/a rising portion) on a vehicle front side, and a rear end portion 63 (a second end portion) on a vehicle rear side. By the provision of the support bracket 6, it is possible to further enhance support rigidity of the HUD device 4. The support bracket 6 is provided in pair on left and right sides at positions associated with the paired left and right locking portions 57 of the support member 5.

The front end portion 62 is a portion to be fixed to the front wall 51 of the support member 5. The front end portion 62 is a rising portion bent upward from a front end of the horizontal portion 61, and extends upward in such a manner as to overlap the locking portion 57 along the front wall 51. Specifically, the support bracket 6 has a shape such that the support bracket 6 extends forward of the front wall 51 from below the lower wall 52 of the support member 5. The rear end portion 63 is a portion to be fixed to the instrument panel reinforcement 3 together with the lower flange portion 54. The rear end portion 63 is a portion bent downward from a rear end of the horizontal portion 61, and is interposed between the support pieces 32 of the instrument panel reinforcement 3 and the lower flange portion 54 of the support member 5.

Figure 11:
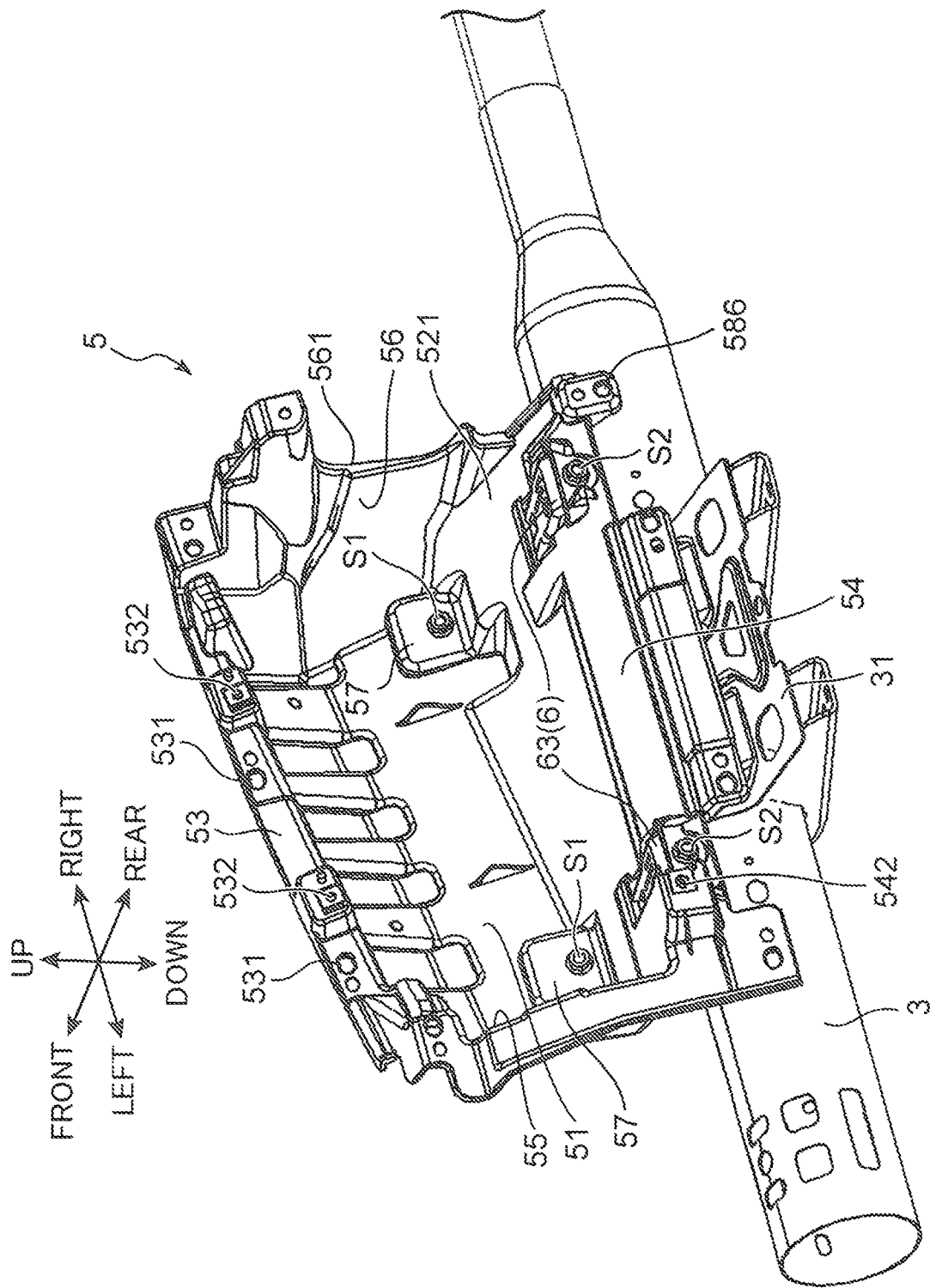
FIG. 11 is a perspective view illustrating the instrument panel reinforcement and the support member.

Referring to FIG. 5, and FIG. 9 to FIG. 11, a support structure of the support member 5 is described. FIG. 11 is a perspective view illustrating a left portion of the instrument panel reinforcement 3 and the support member 5. The front end portion 62 of the support bracket 6 overlaps an outer surface of the locking portion 57 of the support member 5 in the front-rear direction. A through-hole is formed in the front end portion 62. The locking portion 57 and the front end portion 62 are positioned in such a manner that the through-hole and the screw hole 571 of the locking portion 57 are aligned. A first fixing screw S1 is inserted into the through-hole and the screw hole 571, and the support member 5 and the support bracket 6 are fixed to each other.

A through-hole is formed in the rear end portion 63 of the support bracket 6 in the same manner as the front end portion 62. The support piece 32, the rear end portion 63, and the lower flange portion 54 overlap each other in the front-rear direction in such a manner that the through-hole is aligned with the support hole 321 of the support piece 32 of the instrument panel reinforcement 3, and the fixing hole 541 of the lower flange portion 54 of the support member 5. A second fixing screw S2 is inserted into the through-hole, the support hole 321, and the fixing hole 541, and the support member 5 and the support bracket 6 are fixed to the instrument panel reinforcement 3. Further, as illustrated in FIG. 5, a window portion 611 is formed in the horizontal portion 61. A locking piece 522 of the support member 5 is engaged with a front edge of the window portion 611.

[Mounting/Dismounting of HUD Device]

Figure 12:
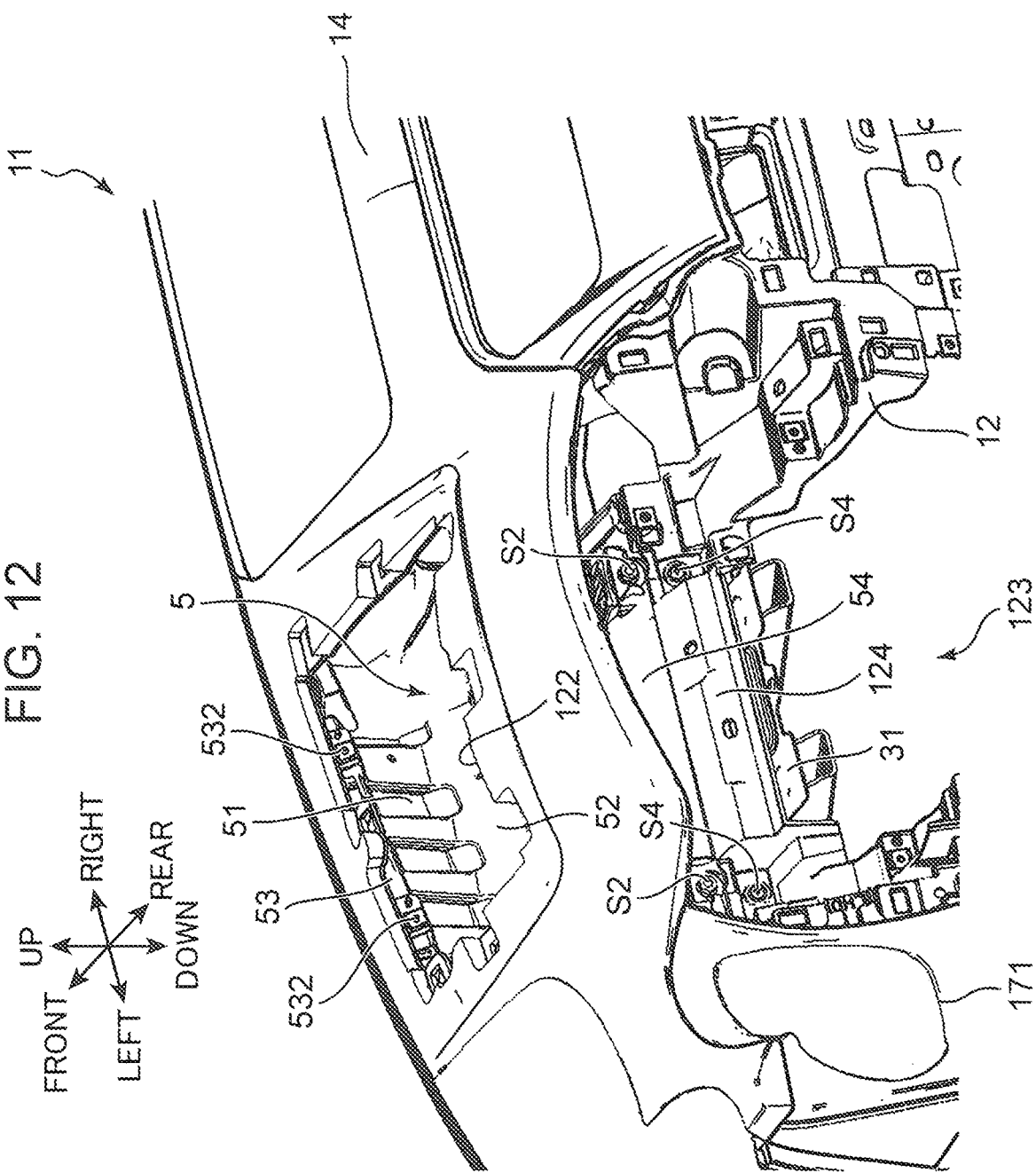
FIG. 12 is a perspective view illustrating a procedure of mounting the head-up display device to the instrument panel.
Figure 13:
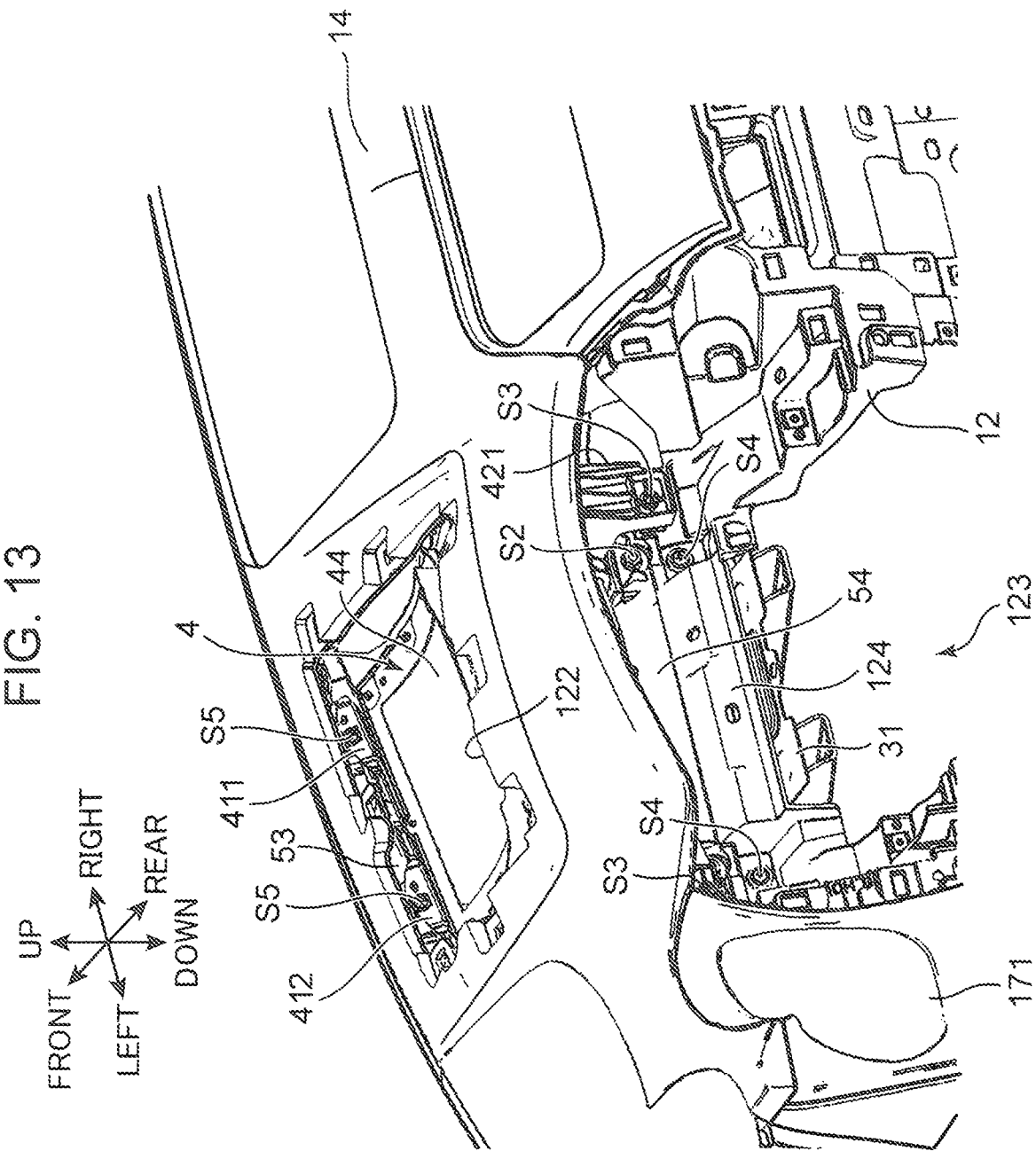
FIG. 13 is a perspective view illustrating the procedure of mounting the head-up display device to the instrument panel.
Figure 14:
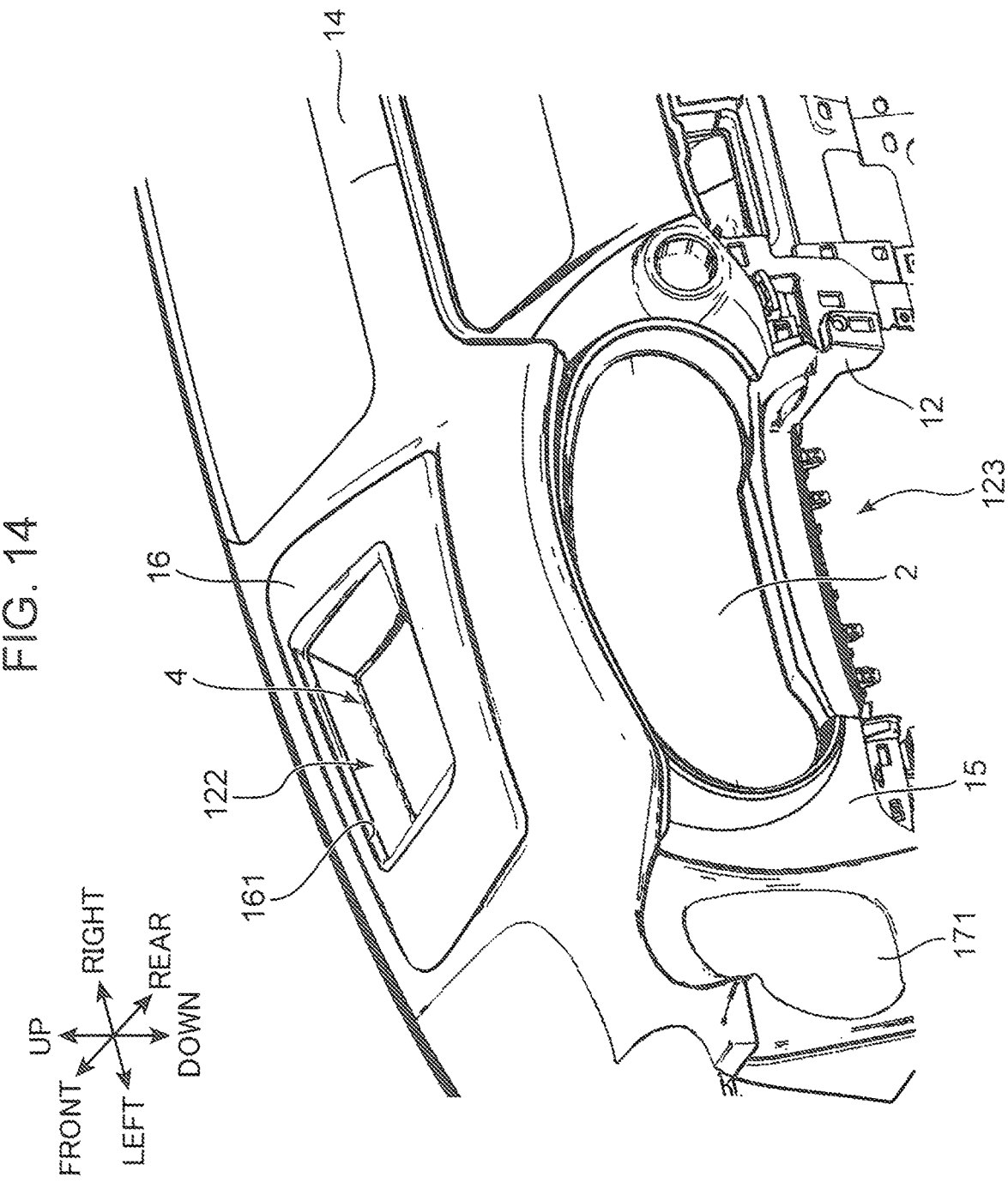
FIG. 14 is a perspective view illustrating the procedure of mounting the head-up display device to the instrument panel.

FIG. 12 to FIG. 14 are perspective views illustrating a procedure of mounting the HUD device 4 to the instrument panel 11. FIG. 12 illustrates a state that the HUD device 4 and the meter panel 2, and the opening cover 16 and the meter cover 15 are dismounted from the instrument panel 11. FIG. 13 illustrates a state that only the HUD device 4 is mounted to the instrument panel 11 from the state illustrated in FIG. 12. FIG. 14 illustrates a state that the meter panel 2, the opening cover 16, and the meter cover 15 are mounted to the instrument panel 11 from the state illustrated in FIG. 12.

Referring to FIG. 12, the support member 5 is mounted within the instrument panel 11. A mounting position of the support member 5 coincides with the upper opening 122 of the instrument panel body 12, and is located on a front side of the lateral opening 123. The support member 5 is mounted to the instrument panel body 12 at the upper flange portion 53 on an upper side, and the middle extension portion 581, the left extension portion 582, and the right extension portion 583 on a lower side.

The upper flange portion 53 is fixed to an upper portion (not illustrated in FIG. 12) of the instrument panel body 12 by unillustrated fixing screws through the fixing holes 531 (FIG. 9). The middle extension portion 581, the left extension portion 582, and the right extension portion 583 are fixed to a support plate portion 124 disposed below the instrument panel body 12. The support plate portion 124 overlaps rear surfaces of the extension portions 581, 582, and 583. FIG. 12 illustrates a state that the middle extension portion 581, the left extension portion 582, and the right extension portion 583 are fixed to the support plate portion 124 by fourth fixing screws S4 through the fixing holes 584 of the middle extension portion 581 and the fixing hole 585 of the left extension portion 582. A positioning boss portion (not illustrated) projecting from a front surface of the support plate portion 124 is fitted in the support hole 586 of the right extension portion 583.

Referring to FIG. 13, the HUD device 4 is mounted inside the instrument panel body 12 through the lateral opening 123. This is because an opening size of the upper opening 122 is smaller than the size of the housing 40 of the HUD device 4, and a space on an upper surface of the instrument panel 11 is narrow due to the presence of the front window 10. On the other hand, the lateral opening 123 is a mounting opening of the meter panel 2 having a size larger than the size of the housing 40. Furthermore, an obstacle is not present on a lower surface of the lateral opening 123. Therefore, an operator is allowed to freely mount and dismount the HUD device 4 in a state that the meter panel 2 is detached.

In a state that the HUD device 4 is mounted to a predetermined position of the instrument panel body 12 (support member 5), the upper right bracket 411 and the upper left bracket 412 overlap the upper flange portion 53 of the support member 5 in the front-rear direction on an upper side of the HUD device 4. In this case, the fixing holes 413 and 414 of the brackets 411 and 412, and the support holes 532 of the upper flange portion 53 are aligned to each other. Then, by inserting fifth fixing screws S5 into the fixing holes 413 and 414, and the support holes 532, the HUD device 4 is fixed to the support member 5.

As described above, the upper flange portion 53 extends upward higher than an upper end of the front surface 41 of the housing 40. Further, the upper right bracket 411 and the upper left bracket 412 are portions projecting upward from the housing 40. Therefore, an operator is allowed to perform a fastening operation of the fifth fixing screws S5 through the upper opening 122 in a state of FIG. 13 that the opening cover 16 is detached. In other words, it is easy to fasten and release a fixing portion to the support member 5 on an upper side of the HUD device 4 through the upper opening 122.

The lower right bracket 421 overlaps the support plate portion 124 of the instrument panel body 12 on a front side of the right extension portion 583, and the lower left bracket 422 overlaps a left portion of the lower flange portion 54 in the front-rear direction, respectively, on a lower side of the HUD device 4. In this case, the fixing hole 423 of the lower right bracket 421 and a screw hole of the support plate portion 124 are aligned and fastened to each other by a third fixing screw S3. A cross-sectional view of FIG. 6 is a cross-sectional view of a fixing portion of the lower right bracket 421 by the third fixing screw S3. Further, the fixing hole 424 of the lower left bracket 422 and the support hole 542 of the lower flange portion 54 are aligned and fastened to each other by the third fixing screw S3. In a state of FIG. 13 that the meter panel 2 and the meter cover 15 are detached, an operator is allowed to perform a fastening operation of the third fixing screws S3 through the lateral opening 123. In other words, it is easy to fasten and release a fixing portion on a lower side of the HUD device 4 through the lateral opening 123.

As illustrated in FIG. 14, after the fifth fixing screws S5 are fastened, the opening cover 16 is mounted to the upper opening 122. Further, after the third fixing screws S3 are fastened, the meter panel 2 and the meter cover 15 are mounted to the lateral opening 123. Thus, mounting the HUD device 4 to the instrument panel 11 is completed.

When the HUD device 4 is dismounted from the instrument panel 11, first of all, an operator detaches the opening cover 16, the meter panel 2, and the meter cover 15 from the instrument panel body 12. Thereafter, the operator accesses through the upper opening 122, and takes out the fifth fixing screws S5. Further, the operator accesses through the lateral opening 123, and takes out the third fixing screws S3. Thereafter, the HUD device 4 is taken out through the lateral opening 123.

[Advantageous Effects]

According to the interior structure for the vehicle 1 as described above, the HUD device 4 is fixedly supported by the fixing member 5, and the support member 5 is fixed to the instrument panel body 12 by the upper flange portion 53 (first fixing portion) and is fixed to the instrument panel reinforcement 3 by the lower flange portion 54 (second fixing portion). Therefore, it is possible to firmly support the HUD device 4, while using the instrument panel reinforcement 3 as a support base. Further, the support member 5 is a structural member including the front wall 51 and the lower wall 52, and the instrument panel reinforcement 3 is a member disposed below the instrument panel body 12. Therefore, the interior structure is formed as a structure, in which obstructing mounting and dismounting the HUD device 4 to and from the instrument panel 11 due to the presence of a support structure of the HUD device 4 is less likely to occur. Thus, it is easy to mount and dismount the HUD device 4 to and from the instrument panel 11 for maintenance, repair, and the like of the HUD device 4.

Further, the front wall 51 of the support member 5 includes the upper flange portion 53 (extension portion) extending to a position higher than an upper end of the front surface 41 of the HUD device 4 in a state that the HUD device 4 is supported. The upper flange portion 53 is exposed through the upper opening 122 when the opening cover 16 is detached. Therefore, an operator is allowed to access the upper flange portion 53 through the upper opening 122, and to fasten and release the fifth fixing screws S5. Thus, it is possible to simplify an operation of mounting and dismounting the HUD device 4.

A size of the upper opening 122 is set smaller than the size of the housing 40 of the HUD device 4. Thus, although it may not be possible to take out the HUD device 4 through the upper opening 122, it is possible to reduce the size of the upper opening 122 to a minimally required size for projection. Therefore, it is possible to suppress deterioration of design due to an increase in size of the upper opening 122. On the other hand, a size of the lateral opening 123 is a size capable of passing through the housing 40. Therefore, it is easy to mount and dismount the HUD device 4 through the lateral opening 123 for mounting the meter panel 2.

Further, the interior structure includes the support bracket 6 extending in the front-rear direction of the vehicle 1 at a position below the HUD device 4. The support member 5 is fixed to the instrument panel reinforcement 3 via the support bracket 6. In particular, the support bracket 6 includes the horizontal portion 61 extending along a lower surface of the lower wall 52 of the support member 5, and the front end portion 62 extending upward to the locking portion 57 along the front wall 51. This makes it possible to form a structure, in which the support bracket 6 supports the support member 5 in such a manner that the support bracket 6 extends toward the front wall 51 from below the lower wall 52 of the support member 5. This is more advantageous in enhancing rigidity of a support structure of the HUD device 4.

[Description of Modifications]

In the foregoing, an embodiment of the present invention is described. The present invention, however, is not limited to the above, and the following modifications may be provided.

(1) The embodiment describes an example, in which the support member 5 is supported by the instrument panel reinforcement 3 via the support bracket 6. The support bracket 6 may be omitted, and the lower flange portion 54 of the support member 5 or a peripheral portion thereof may be directly mounted to the instrument panel reinforcement 3 (support pieces 32).

(2) The embodiment describes an example, in which the support member 5 includes the front wall 51, the lower wall 52, the left wall 55, and the right wall 56. As far as the support member 5 includes at least the front wall 51 and the lower wall 52, the support member 5 excluding the left wall 55 and the right wall 56 may be used. Further, as far as a projected light beam from the HUD device 4 is not blocked, the support member 5 may include a top plate for covering a part of the upper surface 44 of the housing 40. In this case, the top plate and a part of the upper surface 44 of the housing 40 may be fastened by a fixing screw.

(3) The embodiment describes an example, in which only the lower right bracket 421 of the HUD device 4 is not mounted to the support member 5 but is mounted to the support plate portion 124 of the instrument panel body 12. Alternatively, all the mounting brackets provided in the HUD device 4 may be fixed to the support member 5.

Lastly, features disclosed in the aforementioned embodiment and advantageous effects based on the features are briefly described.

An interior structure for a vehicle according to an aspect of the present invention includes: an instrument panel disposed below a front window; an instrument panel reinforcement extending in a vehicle width direction of the vehicle at a position below the instrument panel; a head-up display device having a housing structure including a front surface and a lower surface, and configured to project information onto the front window; and a support member mounted in the instrument panel, and configured to fixedly support the head-up display device. The support member includes a front wall facing the front surface of the head-up display device and a lower wall facing the lower surface, a first fixing portion serving as a fixing portion to the instrument panel, and a second fixing portion serving as a fixing portion to the instrument panel reinforcement.

According to the interior structure, the head-up display device is fixedly supported by the support member, and the support member includes the first fixing portion to the instrument panel, and the second fixing portion to the instrument panel reinforcement. Therefore, it is possible to firmly support the head-up display device, while using the instrument panel reinforcement as a support base. Further, the support member is a structural member including the front wall and the lower wall, and the instrument panel reinforcement is a member disposed below the instrument panel. Therefore, it is possible to form the interior structure as a structure, in which obstructing mounting and dismounting the head-up display device to and from the instrument panel due to the presence of a support structure of the head-up display device is less likely to occur.

In the interior structure, preferably, the instrument panel may include an upper opening formed in an upper surface thereof for projection by the head-up display device. The front wall may include an extension portion higher than an upper end of the front surface of the head-up display device, and accessible through the upper opening. A fixing portion to the head-up display device may be formed on the extension portion.

According to the interior structure, an operator is allowed to access the fixing portion to the support member of the head-up display device through the upper opening of the instrument panel, and to fix and release the fixing portion. Therefore, it is possible to simplify an operation of mounting and dismounting the head-up display device.

In the interior structure, preferably, a size of the upper opening may be a size smaller than a size of a housing of the head-up display device.

According to the interior structure, although it may not be possible to take out the head-up display device through the upper opening of the instrument panel, it is possible to reduce the size of the upper opening to a minimally required size for projection. Therefore, it is possible to suppress deterioration of design due to an increase in size of the upper opening. It should be noted that even when it may not be possible to take out the head-up display device through the upper opening, it is possible to take out the head-up display device from a side of the instrument panel corresponding to a rear side of the vehicle.

In the interior structure, preferably, the instrument panel may include a lateral opening for mounting a meter panel on a rear side of the vehicle. A size of the lateral opening may be a size capable of receiving a housing of the head-up display device.

According to the interior structure, it is possible to mount and dismount the head-up display device through the lateral opening for mounting a meter panel. This contributes to simplification of the mounting/dismounting operation.

The interior structure may preferably include a support bracket extending in a front-rear direction of the vehicle at a position below the head-up display device. The support bracket may include a first end portion to be fixed to a locking portion of the support member, and a second end portion to be fixed to the instrument panel reinforcement.

According to the interior structure, the support member is fixed to the instrument panel reinforcement via the support bracket. This is more advantageous in enhancing support rigidity of the head-up display device.

In the interior structure, preferably, the locking portion of the support member may be formed on the front wall. The support bracket may include a horizontal portion extending along a lower surface of the lower wall, and a rising portion extending upward to the locking portion along the front wall, and including the first end portion.

According to the interior structure, the support bracket supports the support member in such a manner that the support bracket extends toward the front wall from below the lower wall of the support member. This is more advantageous in enhancing support rigidity of the head-up display device.

According to the present invention as described above, it is possible to provide an interior structure for a vehicle, which makes it easy to mount and dismount a head-up display device to and from an instrument panel, while firmly supporting the head-up display device within the instrument panel.

The invention claimed is:

1. An interior structure for a vehicle, comprising:
an instrument panel disposed below a front window;
an instrument panel reinforcement extending in a vehicle width direction of the vehicle at a position below the instrument panel;
a head-up display device having a housing structure including a front surface and a lower surface, and configured to project information onto the front window; and
a support member mounted in the instrument panel, and configured to fixedly support the head-up display device, wherein
the support member includes
a front wall facing the front surface of the head-up display device and a lower wall facing the lower surface,
a first fixing portion located in the front wall serving as a fixing portion to the instrument panel, and
a second fixing portion located in the lower wall serving as a fixing portion to the instrument panel reinforcement.

2. The interior structure for a vehicle according to claim 1, wherein
the instrument panel includes an upper opening formed in an upper surface thereof for projection by the head-up display device,
the front wall includes an extension portion higher than an upper end of the front surface of the head-up display device, and accessible through the upper opening, and
a fixing portion to the head-up display device is formed on the extension portion.

3. The interior structure for a vehicle according to claim 2, wherein
a size of the upper opening is a size smaller than a size of a housing of the head-up display device.

4. The interior structure for a vehicle according to claim 2, wherein
the instrument panel includes a lateral opening for mounting a meter panel on a rear side of the vehicle, and
a size of the lateral opening is a size capable of receiving a housing of the head-up display device.

5. The interior structure for a vehicle according to claim 1, further comprising
a support bracket extending in a front-rear direction of the vehicle at a position below the head-up display device, wherein
the support bracket includes a first end portion to be fixed to a locking portion of the support member, and a second end portion to be fixed to the instrument panel reinforcement.

6. The interior structure for a vehicle according to claim 5, wherein
the locking portion of the support member is formed on the front wall, and
the support bracket includes
a horizontal portion extending along a lower surface of the lower wall, and
a rising portion extending upward to the locking portion along the front wall, and including the first end portion.

7. The interior structure for a vehicle according to claim 3, wherein
the instrument panel includes a lateral opening for mounting a meter panel on a rear side of the vehicle, and
a size of the lateral opening is a size capable of receiving a housing of the head-up display device.

8. The interior structure for a vehicle according to claim 2, further comprising
a support bracket extending in a front-rear direction of the vehicle at a position below the head-up display device, wherein
the support bracket includes a first end portion to be fixed to a locking portion of the support member, and a second end portion to be fixed to the instrument panel reinforcement.

9. The interior structure for a vehicle according to claim 3, further comprising
a support bracket extending in a front-rear direction of the vehicle at a position below the head-up display device, wherein
the support bracket includes a first end portion to be fixed to a locking portion of the support member, and a second end portion to be fixed to the instrument panel reinforcement.

10. The interior structure for a vehicle according to claim 4, further comprising
a support bracket extending in a front-rear direction of the vehicle at a position below the head-up display device, wherein
the support bracket includes a first end portion to be fixed to a locking portion of the support member, and a second end portion to be fixed to the instrument panel reinforcement.

11. The interior structure for a vehicle according to claim 7, further comprising
a support bracket extending in a front-rear direction of the vehicle at a position below the head-up display device, wherein
the support bracket includes a first end portion to be fixed to a locking portion of the support member, and a second end portion to be fixed to the instrument panel reinforcement.

12. The interior structure for a vehicle according to claim 8, wherein
the locking portion of the support member is formed on the front wall, and
the support bracket includes
a horizontal portion extending along a lower surface of the lower wall, and
a rising portion extending upward to the locking portion along the front wall, and including the first end portion.

13. The interior structure for a vehicle according to claim 9, wherein
the locking portion of the support member is formed on the front wall, and
the support bracket includes
a horizontal portion extending along a lower surface of the lower wall, and
a rising portion extending upward to the locking portion along the front wall, and including the first end portion.

14. The interior structure for a vehicle according to claim 10, wherein
the locking portion of the support member is formed on the front wall, and
the support bracket includes
a horizontal portion extending along a lower surface of the lower wall, and
a rising portion extending upward to the locking portion along the front wall, and including the first end portion.

15. The interior structure for a vehicle according to claim 11, wherein
the locking portion of the support member is formed on the front wall, and
the support bracket includes
a horizontal portion extending along a lower surface of the lower wall, and
a rising portion extending upward to the locking portion along the front wall, and including the first end portion.

* * * * *